United States Patent [19]

Gibson et al.

[11] Patent Number: 5,374,441
[45] Date of Patent: Dec. 20, 1994

[54] HEAT STABLE FAT SUBSTITUTE COMPOSITIONS AND PROCESS

[75] Inventors: Suzanne M. Gibson; George Strauss, both of Piscataway; Bruce P. Wasserman, Belle Mead, all of N.J.

[73] Assignee: Rutgers, The State University of New Jersey, New Brunswick, N.J.

[21] Appl. No.: 830,739

[22] Filed: Feb. 4, 1992

[51] Int. Cl.⁵ ............................................. A23J 3/14
[52] U.S. Cl. .................... 426/656; 426/804; 426/531
[58] Field of Search ............. 426/622, 531, 804, 656, 426/657; 530/372, 373, 362, 367

[56] References Cited

U.S. PATENT DOCUMENTS

| | | | |
|---|---|---|---|
| 4,961,953 | 10/1990 | Singer et al. | 426/656 |
| 5,145,702 | 9/1992 | Stark | 426/804 |
| 5,147,677 | 9/1992 | Ziegler | 426/657 |
| 5,173,322 | 12/1992 | Melachouris | 426/656 |

FOREIGN PATENT DOCUMENTS 9003123  4/1990  WIPO .

OTHER PUBLICATIONS

Aeschbach, "Formation of Dityrosine Crosslinks in Protein by Oxidation of Tyrosine Residues" Bichimica et Biophysica Acta 439(1976) pp. 292–301.

*Primary Examiner*—Carolyn Paden
*Attorney, Agent, or Firm*—Leroy G. Sinn

[57] ABSTRACT

Provided are fat substitute compositions adapted for use in food. The compositions are stable at temperatures at which foods are normally heated in preparation, such as about 350° F., are in the form of water-insoluble microparticles, and are made from orally ingestible proteins. Also provided are processes for the use and manufacture of the microparticle compositions.

13 Claims, No Drawings

HEAT STABLE FAT SUBSTITUTE COMPOSITIONS AND PROCESS

TECHNICAL FIELD

This invention relates to fat substitute compositions adapted for use in food and for substitution for fat compositions used in making certain foods such as baked goods, ice cream, and various other food compositions which are part of normal diets. The compositions are stable at temperatures at which foods are normally heated in preparation, such as about 350° F. Utilization of proteins which are compounds that are known to be safe for oral ingestion can be used in the preparation of these fat substitute compositions. Also included in this invention is a method of reducing the fat intake in the diet without otherwise materially changing the diet. By the use of this invention, the amount of cholesterol, fat and caloric content of the diet can be substantially reduced. Also provided is a method of producing heat stable fat substitute compositions which are orally ingestible.

BACKGROUND ART

Proteins are a normal component of the diet and are recognized as being important in a fully complete and well-balanced diet. It is also well recognized that the fat composition of the diet is desirably reduced in the diets of many people in order to reduce obesity and certain human debilitating conditions and diseases. A high fat content can result in a highly undesired fat level in the body as well as to contribute to certain undesired heart and vascular conditions and other undesired conditions of the human body. The undesirable effects of excess weight are well known and the contribution of excess fat in the diet have resulted in a number of conditions in the vascular system and heart which demonstrate a high desirability of a diet that has reduced fat content.

A number of fat substitute compositions have been proposed, including ones that include protein. For example, certain fat substitute compositions including proteins have been proposed in U.S. Pat. No. 5,021,248.

It is desired that a fat substitute composition be provided which provides the desired taste and mouth feel of foods and yet reduces the proportion of calories derived from fat in the diet. It is also highly desired to provide fat substitute compositions which are stable upon application of heat normally utilized in baking and other cooking procedures which utilize relatively high heat, such as 350°-400° F.

SUMMARY OF INVENTION

Provided by this invention is a stable fat substitute composition which is derived from non-toxic, orally ingestible protein compounds. The compositions are normally stable at high cooking temperatures, such as 350°-400° F. (175°-200° C). The compositions are crosslinked protein compositions which are orally ingestible and which do not contribute to the cholesterol and undesired fat component of normal foods. Crosslinked proteins of this invention have been provided in microparticle size having a particle size wherein the weight of the crosslinked protein is predominantly in a particle size range less than 10 micrometers, preferably in the particle size range of from about 0.1 to about 3 micrometers. Particles of the compositions of the invention retain without substantial degradation the shape and size during normal cooking temperatures of 350° F. or higher, such as in the range of 350°-400° F.

The heat stable protein compositions of this invention are in the form of microparticles having a predominant weight percentage of ten micrometers or less providing upon mixing with a small amount of edible vegetable oil a creamy consistency which has a mouth feel of a smooth, fat-like food. For example, an amount of the heat stable composition can be mixed with a small amount of an edible vegetable oil, such as corn oil, and provide a fluid mixture having mouth feel of a smooth, fat-like food.

Suitable proteins for utilization in making the compositions of this invention are (1) water-soluble proteins, for example, egg albumin, milk proteins, soy protein, legume proteins, cereal proteins, and the like that can be converted into water-insoluble microparticles by a heating procedure hereinafter described, and (2) alcohol-soluble prolamine proteins, for example, zein or gliadin, that can be converted into water-insoluble microparticles either by mixing alcoholic solutions thereof with water or by mixing certain prolamine-containing cereals with water and subjecting them to heat, pressure and mechanical shear such as provided by an extruder. Other orally edible and orally ingestible proteins, preferably those which are natural, can also be used.

The heat stable compositions of this invention can be produced by utilization of suitable crosslinking agents which will provide the above desired characteristics for heat stability and the referred to mouth feel. It has been found suitable to provide the crosslinked fat substitute compositions of this invention by crosslinking the proteins using an oxidative coupling reaction of phenolic acid groups attached to the protein chains. It is presently preferred to use as a crosslinking agent a phenolic acid, such as ferulic acid, caffeic acid, coumaric acid or the like. Other phenolic crosslinking agents can be utilized so long as they are effective and result in a non-toxic orally ingestible crosslinking reaction and provide the other desired properties such as the heat stability in the range of 350° C. or more and provide particles of a suitable smallness in size, such as 10 micrometers or less so as to provide a mouth feel such as a smooth, fat-like food.

Provided by this invention also is a method for providing a heat stable fat substitute composition by reacting the orally ingestible non-toxic protein and oxidative phenolic crosslinking agent to a sufficient degree to provide a composition which can be reduced in size to microparticles which are stable to heating at approximately 350° F. without substantial degradation and without substantial change in shape or size.

It has been found suitable in illustration to utilize a phenolic acid and a suitable oxidizing agent such sold under the designation Oxone ®, a monopersulfate composition, to provide a reaction with albumin, zein or the like to provide heat stable compositions which are suitable as fat substitutes. In general, it has been found that about 2 parts by weight of phenolic acid such as ferulic acid per 100 parts of a suitable protein, along with about 2 parts by weight of a suitable oxidizing agent, such as Oxone ®, or other non-toxic substances. The above illustrative amounts of phenolic acid and oxidizing agents in the initial reaction mixture represent excess amounts; the final combined protein has typically about one percent of phenolic acid and essentially no residual oxidizing agent. Also, it has been found that phenolic acid esters of pentosans (high molecular weight polysaccharides of xylose and arabinose), which are naturally present in corn and wheat flours, can be crosslinked by extrusion-cooking. The crosslinked product, upon isolation as by water-extraction, is in the form of microparticles of about 1–2 micrometers in size which have a smooth mouth feel and are suitable as a fat replacement.

DETAILED DESCRIPTION OF THE INVENTION AND THE PREFERRED EMBODIMENTS

It has been found that the composition of this invention can be prepared in illustration by dissolving 500 parts of a suitable orally-ingestible protein such as egg albumin (chicken) in 1500 or 2000 parts of water. A second solution can be prepared by dissolving 1000 parts of a phenolic acid such as caffeic acid in approximately 1500 or 2000 parts of a basic aqueous solution, such as 2% aqueous potassium hydroxide. The pH of the aqueous solution of phenolic acid can be adjusted to a final pH of about 7. A third solution can be formed by dissolving a suitable amount of an oxidizing agent, such as 5 parts of Oxone potassium monopersulfate composition in about 400 or 500 parts of water.

In illustration, 150 parts of the egg albumin solution, about 400 parts of the phenolic acid solution, and about 400 parts of water can be thoroughly stirred to provide a uniform mixture. Then, an effective amount of the oxidizing solution containing potassium monopersulfate can be added to the albumin mixture, such as 70–100 parts. The solution is thoroughly mixed and permitted to stand for 12–24 hours at room temperature to provide a crosslinked protein composition. This crosslinked protein mixture is added to boiling water, for example, 350 parts of the mixture can be added to a suitable amount of boiling water, such as 2000 parts, with simultaneous sonication or some other effective form of high shear agitation as provided by a high speed rotary homogenizer (for example, a "Tissue Tearor" homogenizer sold by Brinkmann Cole-Parmer) or the like.

Sonication can be carried out by using a probe-type sonicator or other suitable sonicator which is effective in providing the particle size desired. For example, a bath-type sonicator can be used. It has been found that sonication for a short period of time, such as one to two seconds, is usually adequate. A longer time can be used if necessary. The desired microparticles of crosslinked albumin, which is the desired fat substitute composition of the invention, appears as a precipitate in the aqueous medium by forming a turbid suspension.

It has been found that by following this procedure the predominant weight amount of the original albumin is present in a micrometer diameter size of about 10 micrometers or less, the predominant weight amount desirably being in the size of about 1–2 micrometers or less.

An amount of the crosslinked, heat-stable protein composition is reduced in volume by evaporation under vacuum. For example, a temperature of about 175° C. under a vacuum of about 25 inches of mercury can be used to reduce suitably the volume, for example, to about 10% of the original volume. Inspection of the composition under the microscope shows that predominant weight percent of the composition is present in a small micrometer diameter size, such as in a 1–2 micrometer diameter size or less.

In repeating the procedure using a starting solution of egg albumin which is not subjected to the crosslinking, it has been found that the solution after adding to boiling water and sonicating in the above manner, results instead of submicronic particles of the size and shape described above, in the shape of aggregated long filaments.

In further illustration, a prolamine such as zein can be used as the protein in the oxidative phenolic reaction described above. In dissolving zein or other suitable prolamine, it has been found suitable to use as the solvent an aqueous ethanol instead of water. For example, 50–70 percent aqueous ethanol can be used, suitably a 60 percent aqueous ethanol.

Likewise, such aqueous ethanol solvent is desirably used in making the phenolic acid solution, such as a ferulic acid solution (4-hydroxy-3-methoxy cinnamic acid), as well as in making the oxidizing solution, such as a suitable monopersulfate composition.

Other proteins can be utilized, such as gliadin or other suitable proteins. Any protein can be utilized so long as it is non-toxic, orally ingestible and subject to cross-linking in a character that will result in a suitable submicronic particle size which are stable as to size and shape upon heating at a normal baking temperature of 350°–400° F.

Other phenolic crosslinking agents can be used and often are preferable used, such as caffeic acid (3,4-dihydroxy cinnamic acid) in molecularly equivalent amounts.

Insofar as the oxidative phenolic crosslinking is concerned, other crosslinking agents which will be suggested to those having skill in the art in view of the description hereof, can be used. Other crosslinking procedures can also be utilized so long as they will provide the desired particle size and desired heat stability, preferably wherein the predominant weight percent is in a particle size of about 10 micrometers or less, desirably less than 5 micrometers and more preferably in a predominant weight amount in the range of about 1–2 micrometers or less, and a heat stability as described above, at a temperature in the range of about 350°–400° F.

The crosslinking procedure must be capable of providing a composition which results in a heat stable fat substitute composition which is acceptable for incorporation into the human diet, including having a mouth feel which is acceptable, being the mouth feel of a smooth, fat-like food.

The heat stability of the fat substitute compositions of this invention can be evaluated by testing in the following Heat Stability Test: Form a uniform mixture of 10 parts by weight of the microparticles of the composition and 100 parts by weight of a stable and edible vegetable oil, for example, corn oil. The mixture then is heated to 350° F. with occasional stirring for 20 minutes. The desired compositions of this invention will remain substantially stable, including substantially stable as to size, as found by examination under a microscope. The Test can be modified as desired depending upon the composition being tested and other factors so long as the intended evaluation of heat stability is achieved.

Suitable amounts of the heat stable fat substitute compositions of this invention can be used to prepare foods wherein a part or all of the usual fat component is replaced with an appropriate amount of a selected fat substitute composition of this invention. For example, compositions of this invention can be used in making known foods such as ice cream, puddings, cakes, pies, pizza and the like.

Certain other agents can be added to the fat substitute compositions of this invention as desired so long as they are non-toxic and compatible with the fat-substitute compositions of this invention and other components of the foods in which the fat-substitute compositions are utilized. For example, such suitable agents include flavors, spices, colorants, sweeteners, preservatives, texturizing agents and the like.

Certain modifications of the compositions and processes of this invention will become apparent to those skilled in this art and to the extent that such modifications are within the spirit of this invention, are intended to be included herein.

EXAMPLE 1

Make the following solutions:
Solution 1: 1.0 g egg albumin in 3.0 mL water.
Solution 2: 0.100 g caffeic acid in 3 ml 2% potassium hydroxide; neutralize with 1.0N acetic acid to a pH of 7.
Solution 3: 0.100 g Oxone oxidizing composition in 3 ml water.

The following experiments were carried out using the above solutions:

Experiment A: Form a homogeneous mixture of the following:
1) 0.3 ml of Solution 1 (=100 mg albumin)
2) 0.060 ml of Solution 2 (=2 mg caffeic acid potassium salt)
3) 0.58 ml water.

Add to the mixture with stirring 0.060 ml of Solution 3 (=2 mg Oxone).

Experiment B: Form a homogeneous mixture of the following:
1) 0.31 ml of Solution 1
2) 0.64 ml of water.

Then, add with stirring to the mixture 0.060 ml of Solution 3.

The resulting mixtures of Experiment A and Experiment B are held at room temperature for a 20-hour period.

Then, 0.350 ml of each of the mixtures of Experiment A and Experiment B, are respectively added by injection using a syringe into 2 mL of boiling water, which is undergoing sonication. The sonication is carried out by using the probe-type sonicator (Heat Systems Ultrasonics) at 25 watt energy input. Sonication can also be carried out using a bath-type sonicator. The injection of the amounts of the mixtures of Experiment A and Experiment B were completed in 1-2 seconds. The result of the injection with sonication is a precipitation of the egg albumin protein as modified providing a turbid suspension.

After cooling the respective turbid suspensions to room temperature, both samples were examined under a microscope at 400 x magnification. It was found that in both instances the modified egg albumin protein product is present in spherical particles. The predominant size of the particles is estimated to be 1-2 micrometers in diameter.

An amount of 0.5 mL of each of the suspensions of Experiment A and Experiment B were added to respective open test tubes and heated in a vacuum oven at 175° C. under a vacuum of about 25" Hg until the volume was reduced to about 0.05 mL. After the respective samples of Experiments A and B with reduced volume were cooled, they were again examined under the microscope. It was observed that the particles in the sample Experiment A mixture still retain the egg albumin modified particles in the 1-2 estimated micrometer diameter size. In contrast, the egg albumin particles of the sample of Experiment B were observed to be aggregated into long filaments. Therefore, the results of the experiment show that the 1-2 micrometer diameter size of the albumin modified protein microparticles resulting from Experiment A retain particle stability at a high temperature of about 350° F.

EXAMPLE 2

Make the following solutions:
Solution 1: 1.0 g zein in 5 ml 60% ethanol.
Solution 2: 0.1 g potassium ferulate in 1 ml 60% ethanol.
Solution 3: 0.02 g Oxone oxidizing composition in 1 ml 60% ethanol.

The following experiments are conducted:

Experiment A: Form a homogeneous mixture of the following:
1) 0.5 ml of Solution 1 (=100 mg zein)
2) 0.02 ml of Solution 2 (=2 mg potassium ferulate)
3) 0.10 ml of Solution 3 (=2 mg Oxone oxidizing composition)

Experiment B: 0.5 ml of Solution 1 is used for the experiment.

Both the mixtures of Experiment A and Experiment B are gently tumbled on a rotator at room temperature for 16 hours. Then, an amount of 0.60 mL of ethanol is added to each by stirring, increasing the ethanol concentration to about 80%. In the mixture of Experiment A, the Oxone and the unreacted potassium ferulate precipitated and the precipitate is removed by centrifugation. The alcoholic mixtures of Experiment A and Experiment B are respectively rapidly poured, with vortex stirring, into water at a ratio of 1 volume alcoholic solution of the respective mixtures of Experiment A and Experiment B into 2 volumes of water. A turbid suspension results in the case of each mixture of Experiment A and Experiment B. Examination under a microscope using 400 x magnification shows round particles of 1-2 micrometer diameter. The ratio of alcoholic solution to water can be varied as long as the final ethanol concentration is less than 40%.

The zein suspensions of Experiment A and Experiment B are tested for heat stability by adding the suspensions to corn oil (as an inert heat transfer medium). The resulting mixtures are heated slowly in a vacuum oven to 180° C. During this heating process in a vacuum oven at about 25 inches of Hg, the water is removed. In the case of the particles of Experiment A, the particles appear to remain at a size of 1-2 micrometer diameter. In contrast, in the case of Experiment B, the particles formed large clumps.

Analysis showed that reacted zein protein of Experiment A contained 1% phenolic acids. On the other hand, the zein protein product of Experiment B contained 0.1% phenolics, as an impurity of the material as received.

EXAMPLE 3

Corn meal was extruded in a twin-screw extruder. The initial moisture content is about 25%. The screw speed used is 200 rpm. Final extrusion temperature at the die is 200° C. The corn meal extrudate is ground to 20 mesh using a Wiley mill (obtained from Arthur H. Thomas Co., Philadelphia). A one gram quantity of the resulting ground extrudate of corn meal is washed three times with 10 mL quantities of warm 70% aqueous ethanol. Centrifugation is employed at the end of each washing. The washed corn meal residue is heated three times with 10 mL quantities of water at 90° C. for 3-5 minutes. The aqueous extracts are removed by centrifugation and are combined. The resulting mixture when cooled to room temperature is a turbid suspension with some solids settling out. The solid material settling out is regarded as cell wall material. The solid material is removed by mild centrifugation, using a bench centrifuge at 100 rpm for 5 minutes. The resulting turbid supernatent, upon examination, is found to consist of microparticles having a size predominantly by weight of about 1-2 micrometers in diameter. These particles consist of starch, protein, and phenolics (present in corn meal as a natural constituent). The ratio of these components depends on extraction conditions. These microparticles are resistant to coagulation when heated. The aqueous suspension of the microparticles is reduced in volume by evaporation. The concentrated aqueous suspension can be lyophilized to recover the microparticles in solid form if desired.

The corn meal can, alternatively, be mixed with up to 50 percent by weight of zein prior to extrusion. This provides a final microparticle product having a higher protein content.

Phenolic acids are present in corn meal partly in the free state and partly as esters of pentosans. It is believed that the phenolic acids react with the protein of corn zein and possibly also with the starch during the extrusion process, which results from exposure to mechanical shear, heat and pressure. The result is the formation of a network of polymer chains yielding the microparticles of this invention.

What is claimed is:

1. A crosslinked protein fat-substitute composition which is orally ingestible, characterized as follows:
   1) the protein used to provide said crosslinked protein being an orally ingestible protein;
   2) said crosslinked protein being water insoluble;
   3) said crosslinked protein being capable of being formed in a predominant weight range into microparticles having a particle size in the range of about 10 micrometers or less;
   4) said microparticles being stable to heating at 350° F. without substantial degradation and without substantial change in shape or size; and
   5) said fat substitute composition providing a mouth feel of a smooth, fat-like food;
   said crosslinked protein formed using oxidative coupling reaction of phenolic acid groups attached to the chains of said protein.

2. A composition of claim 1 wherein the predominant weight fraction of the microparticles have a particle size in a range of about 0.1 to about 3 micrometers.

3. A composition of claim 1 wherein the protein used for crosslinking is selected from the group consisting of water-soluble proteins and prolamine proteins.

4. A composition of claim 1 wherein the protein used for crosslinking is a water-soluble protein.

5. A composition of claim 1 wherein the protein used for crosslinking is a prolamine protein.

6. A composition of claim 1 wherein the phenolic acid used in the crosslinking reaction is selected from the group consisting of ferulic acid, caffeic acid, coumaric acid and esters and salts thereof.

7. A composition of claim 1 wherein the protein is obtained from a prolamine-containing cereal.

8. A composition of claim 7 wherein said protein fat-substitute composition, which is stable to heating as defined, is obtained by subjecting a prolamine-containing cereal flour to elevated temperature whereby the heat stabilizing reaction occurs and isolating said microparticles of said composition.

9. A composition of claim 1 wherein the protein used for crosslinking is albumin.

10. A composition of claim 1 wherein the protein used is zein.

11. A heat-stable protein fat-substitute composition which is orally ingestible, characterized as follows:
   a) the protein used to provide said heat-stable protein being an orally ingestible protein;
   b) said heat-stable protein being water insoluble and having heat stability as provided by the reaction of said protein of a) and a phenolic acid selected from the group consisting of ferulic acid, caffeic acid, coumaric acid and esters and orally ingestible salts thereof, said protein of "a)" used in said reaction is albumin;
   c) said heat-stable protein being capable of being formed into microparticles wherein a predominant weight fraction of the microparticles have a particle size in the range of about 0.1 to about 3 micrometers or less;
   d) said microparticles being stable to heating at 350° F. without substantial degradation and without substantial change in shape or size in the Heat Stability Test; and
   e) said microparticles providing a mouth feel of a smooth, fat-like food.

12. A process of providing a protein fat-substitute composition which is orally ingestible and which is stable to heat as defined, characterized as follows:
   1) the protein used to provide said heat stable protein being an orally ingestible protein;
   2) said heat stable protein being water insoluble;
   3) said heat stable protein being capable of being formed in a predominant weight fraction of microparticles having a particle size in the range of 10 micrometers or less;
   4) said microparticles being stable to heating at 350° without substantial degradation and without substantial change in shape or size; and
   5) said fat substitute composition providing a mouth feel of a smooth, fat-like food; said heat stable protein being formed by using an oxidative heat stabilizing reaction of phenolic acid groups with the chains of said protein, said reaction being carried out by forming a mixture of a prolamine-containing cereal flour with an effective amount of water, subjecting said mixture to an elevated reaction temperature, pressure and mechanical shear to provide said heat stable protein fat-substitute composition.

13. A heat-stable composition which is a protein fat-substitute product and is orally ingestible, characterized as follows:
   a) the protein used to provide said heat stable protein being an orally ingestible protein selected from the group consisting of water-soluble proteins and prolamine proteins;
   b) said heat stable protein being water insoluble and the reaction to provide the heat stability of said protein involves use of a phenolic acid selected from the phenolic acid group consisting of ferulic acid, caffeic acid, coumaric acid and esters and orally ingestible salts thereof;

c) said heat stable protein being capable of being formed into microparticles wherein a predominant weight fraction of the microparticles have a particle size in the range of about 0.1 to about 3 micrometers or less;

d) said microparticles being stable to heating at 350° F. without substantial degradation and without substantial change in shape or size in the Heat Stability Test; and e) said microparticles providing a mouth feel of a smooth, fat-like foot.

* * * * *

UNITED STATES PATENT AND TRADEMARK OFFICE
CERTIFICATE OF CORRECTION

PATENT NO. : 5,374,441
DATED : December 20, 1994
INVENTOR(S) : Suzanne M. Gibson, et. al.

It is certified that error appears in the above-indentified patent and that said Letters Patent is hereby corrected as shown below:

Column 10, lines 5-6, claim 13, the text should read as follows:
e) said microparticles providing a mouth feel of a smooth, fat-like food.

Signed and Sealed this

Twenty-second Day of August, 1995

Attest:

BRUCE LEHMAN

Attesting Officer

Commissioner of Patents and Trademarks